(12) United States Patent
Shao et al.

(10) Patent No.: US 12,314,019 B2
(45) Date of Patent: May 27, 2025

(54) INDUSTRIAL INTERNET OF THINGS BASED ON ABNORMAL IDENTIFICATION, CONTROL METHOD, AND STORAGE MEDIA THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN); Yongzeng Liang, Chengdu (CN); Yuefei Wu, Chengdu (CN)

(73) Assignee: CHENGDU QINCHUAN IOT TECHNOLOGY CO., LTD., Chengdu (CN)

(*) Notice: Subject to any disclaimer, the term of this patent is extended or adjusted under 35 U.S.C. 154(b) by 357 days.

(21) Appl. No.: 18/046,156

(22) Filed: Oct. 13, 2022

(65) Prior Publication Data

US 2023/0168643 A1    Jun. 1, 2023

(51) Int. Cl.
*G05B 13/04* (2006.01)
*G05B 23/02* (2006.01)

(52) U.S. Cl.
CPC ....... *G05B 13/048* (2013.01); *G05B 23/0224* (2013.01); *G05B 23/0243* (2013.01); *G05B 23/0275* (2013.01)

(58) Field of Classification Search
CPC .................. G05B 23/0243; G05B 23/0275
USPC ........................................................... 700/29
See application file for complete search history.

(56) References Cited

U.S. PATENT DOCUMENTS

| 10,575,072 B1* | 2/2020 | Shao ............ H04Q 9/00 |
| 2019/0210176 A1* | 7/2019 | Yamamoto ...... G05B 13/0265 |
| 2020/0272125 A1* | 8/2020 | Okudera .......... G06F 17/18 |

* cited by examiner

*Primary Examiner* — Jigneshkumar C Patel
(74) *Attorney, Agent, or Firm* — METIS IP LLC

(57) ABSTRACT

The present disclosure discloses a control method of industrial Internet of Things (IoT) based on abnormal identification. The IoT includes: an obtaining unit, which is configured to obtain a first machining parameter; a detection unit, which is configured to obtain real-time image data when the first machining parameter is abnormal; an extraction unit, which is configured to obtain a keyframe and obtain a second machining parameter; a judgment unit, which is configured to determine an abnormal cause based on the first machining parameter and the second machining parameter; and a communication unit, which is configured to transmit the abnormal cause to a user terminal through a service platform.

20 Claims, 5 Drawing Sheets

200

S1: Obtaining force data of a spindle of a lathe on a production line through the sensor network platform as a first machining parameter S2: Detecting the first machining parameter, and obtaining real-time image data of a product processed by the lathe corresponding to the first machining parameter through the sensor network platform when the first machining parameter is abnormal S3: Obtaining a keyframe from the real-time image data, and obtaining a second machining parameter from the keyframe, the second machining parameter being processing surface data of the product S4: Determining an abnormal cause based on the first machining parameter and the second machining parameter S5: Transmitting the abnormal cause to a user terminal through a service platform

Determining a first feature and a second feature based on the first machining parameter, wherein the first feature includes a time history curve and the second feature includes at least one of an average value of the first matching parameter, a maximum value of the first matching parameter, a minimum value of the first matching parameter, or an integral under the curve of the time history curve

320

Determining a first prediction result based on the processing of the first feature and the second feature by the first processing model, the first prediction result including at least two abnormal causes and probabilities corresponding to the abnormal causes

FIG. 3

INDUSTRIAL INTERNET OF THINGS BASED ON ABNORMAL IDENTIFICATION, CONTROL METHOD, AND STORAGE MEDIA THEREOF

TECHNICAL FIELD

The present disclosure involves industrial Internet of Things technology, and specifically an industrial Internet of Things (IoT) based on abnormal identification, control method, and storage media thereof.

BACKGROUND

Intelligent machine tools, an important part of intelligent manufacturing, play decisive role in the manufacturing process. Intelligent machine tools understand the entire process of manufacturing, which can monitor, diagnose and correct various kinds of deviations that occur during production, can provide an optimization plan for production, and calculate the remaining life of the cutting tool, spindles, bearings, and guide rails, so that users can clearly know their remaining use time and replacement time. However, in actual use, since the parameters related to cutting are affected by many aspects, the accuracy of only using these parameters as the evaluation of the machining process is poor.

SUMMARY

One aspect of the embodiments of the present disclosure provides an industrial Internet of Things (IoT) based on abnormal identification including a service platform, a management platform, and a sensor network platform that interact in turn. The management platform includes:
  an obtaining unit, which is configured to obtain force data of a spindle of a lathe on a production line through the sensor network platform as a first machining parameter;
  a detection unit, which is configured to detect the first machining parameter, and obtain real-time image data of a product processed by the lathe corresponding to the first machining parameter through the sensor network platform when the first machining parameter is abnormal;
  an extraction unit, which is configured to obtain a keyframe from the real-time image data, and obtain a second machining parameter from the keyframe, the second machining parameter being processing surface data of the product;
  a judgment unit, which is configured to determine an abnormal cause based on the first machining parameter and the second machining parameter; and
  a communication unit, which is configured to transmit the abnormal cause to a user terminal through the service platform.

Another aspect of the embodiments of the present disclosure provides a control method of industrial IoT based on abnormal identification applied to a service platform, a management platform, and a sensor network platform that interact in turn. The control method performed by the management platform includes:
  obtaining force data of a spindle of a lathe on a production line through the sensor network platform as a first machining parameter;
  detecting the first machining parameter, and obtaining real-time image data of a product processed by the lathe corresponding to the first machining parameter through the sensor network platform when the first machining parameter is abnormal;
  obtaining a keyframe from the real-time image data, and obtaining a second machining parameter from the keyframe, the second machining parameter being processing surface data of the product;
  determining an abnormal cause based on the first machining parameter and the second machining parameter; and
  transmitting the abnormal cause to a user terminal through the service platform.

Another aspect of the embodiments of the present disclosure provides a non-transitory computer-readable storage medium which stores computer instructions. When the computer instructions are executed by a processor, the control method of industrial IoT based on abnormal identification is implemented.

BRIEF DESCRIPTION OF THE DRAWINGS

The present disclosure will be further described in the form of exemplary embodiments, which will be described in detail by the accompanying drawings. These embodiments are non-limiting exemplary embodiments, in which the same reference numerals represent the same structures, and wherein:
FIG. 2 is a schematic flowchart of the control method of industrial IoT based on abnormal identification according to some embodiments of the present disclosure;
FIG. 3 is an exemplary flowchart of generating a first prediction result according to some embodiments of the present disclosure.

DETAILED DESCRIPTION

Figure 1:
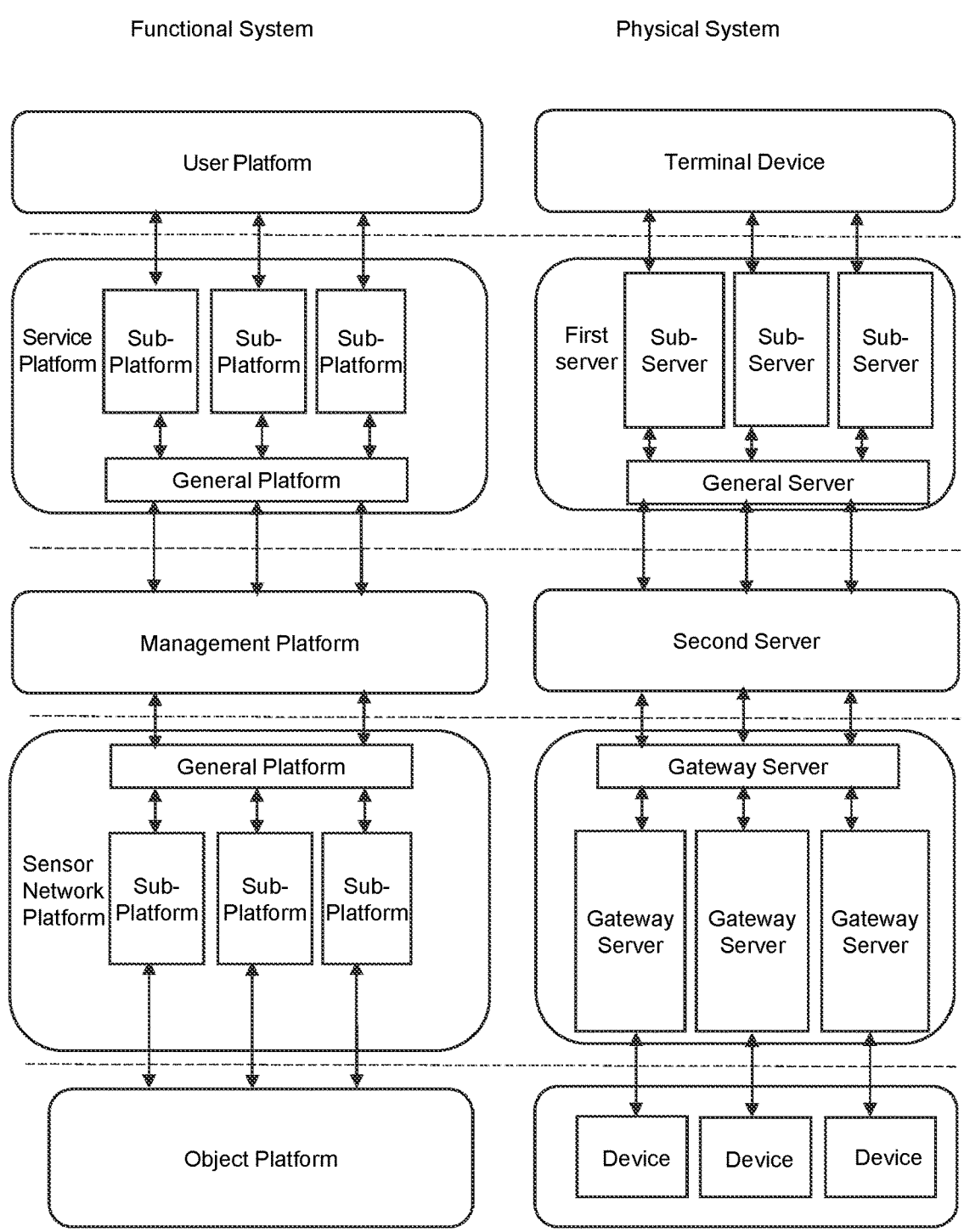
FIG. 1 is a schematic diagram of the communication architecture of the industrial IoT based on abnormal identification according to some embodiments of the present disclosure.

In order to more clearly explain the technical scheme of the embodiment of the present disclosure, the accompanying drawings required in the description of the embodiment will be briefly introduced below. Obviously, the drawings in the following description are only some examples or embodiments of the disclosure. For those skilled in the art, the resent disclosure can also be applied to other similar situations according to these drawings without paying creative labor. Unless obviously obtained from the context or the context illustrates otherwise, the same numeral in the drawings refers to the same structure or operation.

It should be understood that "systems", "devices", "units", and/or "modules" used herein are one method for distinguishing different components, elements, components, parts, or assemblies of different levels. However, if other words can achieve the same purpose, the words can be replaced by other expressions.

As shown in the present disclosure and the claims, unless the context clearly suggests exceptional circumstances, the words "a", "an" and/or "the" do not specifically refer to the singular form, but may also include the plural form; the plural form refers to the singular form as well. Generally speaking, the terms "include" and "include" only indicate that the clearly identified steps and elements are included, and these steps and elements do not constitute an exclusive list, and the method or equipment may also contain other steps or elements.

The flowcharts used in the present disclosure illustrate operations that the system implements according to some embodiments of the present disclosure. It should be understood that the foregoing or following operations may not necessarily performed exactly in order. Conversely, the operations may be implemented in an inverted order, or simultaneously. At the same time, other operations can also be added to these processes or to remove one step or step operation from these processes.

FIG. 1 is a schematic diagram of the communication architecture of the industrial IoT based on abnormal identification according to some embodiments of the present disclosure.

As shown in FIG. 1, the industrial Internet of Things (IoT) based on abnormal identification can include a user platform, a service platform, a management platform, a sensor network platform and an object platform that interact in turn. The management platform includes:
- an obtaining unit, which is configured to obtain force data of a spindle of a lathe on a production line through the sensor network platform as a first machining parameter;
- a detection unit, which is configured to detect the first machining parameter, and obtain real-time image data of a product processed by the lathe corresponding to the first machining parameter through the sensor network platform when the first machining parameter is abnormal;
- an extraction unit, which is configured to obtain a keyframe from the real-time image data, and obtain a second machining parameter from the keyframe, the second machining parameter being processing surface data of the product;
- a judgment unit, which is configured to determine an abnormal cause based on the first machining parameter and the second machining parameter; and
- a communication unit, which is configured to transmit the abnormal cause to a user terminal through the service platform.

Among the existing technologies, the force data collected on the spindle of the lathe, such as tangential stress, axial stress, etc. of the spindle, is an important basis for evaluating the production status of the lathe. However, when evaluating the production condition of the lathe, the force data may be affected by the conditions of the parts and tools on the lathe. When a model is trained by the existing machine learning algorithm, the accuracy of the model is not high. The main reason is that the occurrence of defects of the parts and the defects of the tool or not may generate the same force data, and it is difficult for the general machine learning model to detect the defects of the parts and the defects of the knife.

When implementing the embodiments of the present disclosure, a dual identification plan based on force data and image recognition technology is adopted, which is based on the five-platform structure proposed by the inventor. The user platform is a terminal that displays information to users and receives user instructions, the object platform is the production line equipment. In the embodiments of the present disclosure, the object platform can correspond to the lathe and the sensor corresponding to the lathe.

In the embodiments of the present disclosure, to the process of obtaining the first machining parameter can be performed based on the prior art, which is not limited in the embodiments of the present disclosure. When the first machining parameter is abnormal, it means that there are problems with the current lathe need to be dealt with. These problems may be tool chipping, excessive tool wear, excessive material strength of part products, substandard material strength of parts products, processing defects of parts products, tool breakage and other situations. In order to further clarify the actual problems, the embodiments of the present disclosure obtain the corresponding real-time image data, and find the processing surface of the current product from the keyframe of the real-time image data as the processing surface data. Due to the collection of two dimensions of data, that is, the first machining parameter and the second machining parameter, in the process of judging abnormal cause, the problem that single dimension data cannot accurately detect the abnormal conditions of the lathe is effectively avoided. At the same time, since frequent image data processing is not required, the computing pressure of the centralized management platform can also be relieved.

In one possible implementation, the sensor network platform includes a general sensor network platform and at least two sensor network sub-platforms. Different sensor network sub-platforms are used to receive different types of data on the production line. The general sensor network summarizes all data of the sensor network sub-platforms and transmits all the data to the management platform.

The management platform uniformly processes the received data and then uniformly sends the processed data to the service platform. The service platform includes a general service platform and at least two service sub-platforms. The general service platform receives the data transmitted by the management platform and transmits different types of data to the user terminal through the different service sub-platforms.

In the embodiments of the present disclosure, the sensor network platform includes two sensor network sub-platforms. One of the sensor network sub-platforms obtains the first machining parameter from a stress and strain sensor on the production line and transmits the first machining parameter to the general sensor network platform. Another sensor network sub-platform obtains real-time image data from a camera device on the production line and transmits the real-time image data to the general sensor network platform. The general sensor network platform transmits the first machining parameter and the real-time image data to the management platform to complete the operation from the management platform. The service platform includes three service sub-platforms. The general service platform receives the first machining parameter, the abnormal cause and the real-time image data from the management platform. One of the service sub-platforms transmits the first machining parameter to the user terminal, one of the service sub-platforms transmits the abnormal cause to the user terminal, and one of the service sub-platforms transmits the real-time image data to the user terminal.

In one possible implementation, the detection unit is also configured to:
- analyze the first machining parameter along a time history to form a time history curve;
- compare the time history curve to a preset machining parameter curve, and determine the first machining parameter is abnormal when a difference between the time history curve and the machining parameter curve is greater than a preset value; and
- obtain the real-time image data from a starting point when the first machining parameter is abnormal.

When the embodiment of the present disclosure is implemented, in order to judge the abnormality of the first machining parameter, the detection unit can generate a preset machining parameter curve based on the machining parameter under the normal working condition of the lathe. If the first machining parameter deviates from the preset machining parameter curve, it is judged that the first machining parameter is abnormal. Wherein, the detection unit can judge the difference between the time history curve and the machining parameter curve through spectrum analysis, and according to the difference in amplitude, which is not limited in the present disclosure. After the first machining parameter is determined abnormal, the real-time image data is obtained. It should be understood that the collection of real-time image data is continuous, but the real-time image data is obtained when the first machining parameter is abnormal. The real-time image data can be captured by the high-speed camera configured on the lathe.

In one possible implementation, the extraction unit is also configured to:
  calculate energy spectrum data of the first machining parameter when the first machining parameter is abnormal, and obtain a mutation point by performing singular value analysis on the energy spectrum data;
  determine a frame corresponding to the mutation point in the real-time image data as the keyframe; and
  identify processing surface coordinates of the product from the keyframe, and determine a curve function which is formed by processing surface coordinates of all keyframes and is distributed along the time history as the second machining parameter.

When the embodiment of the present disclosure is implemented, since image data analysis is a process with relatively high amount of calculation requirements, the inventor only selects the coordinates of the processing surface corresponding to the keyframe for analysis. Different from the selection of keyframes in the prior art, the embodiment of the present disclosure adopts a keyframe selection manner for the first machining parameter. Selecting keyframes by analyzing the mutation points of the energy spectrum data can better obtain the coordinates of the processing surfaces on various key nodes.

In one possible implementation, the judgment unit is also configured to:
  input the first machining parameter to a first processing model to generate a first prediction result; the first prediction result being at least two abnormal causes corresponding to the first machining parameter;
  input the first machining parameter to a second processing model to generate a second prediction result, the second prediction result being a curve function of reference coordinates of the processing surface corresponding to the first machining parameter distributed along time history; and
  generate a coordinate difference by comparing the second prediction result with the second machining parameter, and select an abnormal cause corresponding to the first machining parameter and the second machining parameter from the first prediction result according to the coordinate difference.

When the embodiment of the present disclosure is implemented, the management platform adopts two processing models with better robustness to troubleshoot the abnormal cause. The first processing model is a neural network model that can use single-input dual-output or single-input multiple-output. Since multiple output results are allowed in the training of the first processing model, the constraints on the model are relaxed, so that the model itself is more robust and more accurate. The second processing model is a model for simulating the working condition of the lathe under the first machining parameter, and the simulation result is a curve function of the reference coordinates. In the embodiments of the present disclosure, the reference coordinates can be calculated under the condition of loose limits. If the limited knife is abnormal or the limited product is abnormal, the main idea is to relax the excessive constraints of the first processing model to the second processing model. Since the reference coordinates are calculated under loosely limited conditions, the comparison of the second machining parameter and the curve function corresponding to the reference coordinates can determine an accurate abnormal result from the first prediction result.

In one possible implementation, the second processing model corresponds to deterioration of a knife tool of the lathe or deterioration of a product to be processed; and
  the reference coordinates are product processing surface coordinates corresponding to the deterioration of the knife tool of the lathe or the deterioration of the product to be processed under the condition of the first machining parameter.

When the embodiment of the present disclosure is implemented, if the degree of similarity between the second prediction result and the corresponding second machining parameter is higher than a preset value, a deterioration object corresponding to the second processing model is selected from the first prediction result as the abnormal cause; if the degree of similarity between the second prediction result and the corresponding second machining parameter is lower than or equal to a preset value, a deterioration object not corresponding to the second processing model is selected from the first prediction result as the abnormal cause.

In some embodiments, the second processing model is trained based on the deterioration of the tool. When the first prediction result calculated by the first machining parameter is excessive tool wear and processing defects in the part product, if the second prediction result is compared with the second machining parameter, and it is found that the second prediction result is in good agreement with the second machining parameter, it is determined that the first prediction result should finally select the choice of tool deterioration, that is, the choice of excessive tool wear. In this way, different dimensions of data are calculated separately to effectively improve the robustness and accuracy of recognition models.

FIG. 2 is a schematic flowchart of the control method of industrial IoT based on abnormal identification according to some embodiments of the present disclosure.

As shown in FIG. 2, the control method of industrial IoT based on abnormal identification can be applied to the control system for industrial IoT based on abnormal identification in FIG. 1, and the control method of industrial IoT based on abnormal identification can further include the following contents in Step S1-Step S5.
  S1: obtaining force data of a spindle of a lathe on a production line through the sensor network platform as a first machining parameter;
  S2: detecting the first machining parameter, and when the first machining parameter is abnormal, obtaining real-time image data of a product processed by the lathe corresponding to the first machining parameter through the sensor network platform;
  S3: obtaining a keyframe from the real-time image data, and obtaining a second machining parameter from the keyframe, the second machining parameter being the processing surface data of the product;

S4: determining an abnormal cause based on the first machining parameter and the second machining parameter;

S5: transmitting the abnormal cause to a user terminal through a service platform.

In one possible implementation, the detecting the first machining parameter, and obtaining a real-time image of the product processed by the lathe corresponding to the first machining parameter through the sensor network platform when the first machining parameter is abnormal includes:

analyzing the first machining parameter along a time history to form a time history curve;

comparing the time history curve to a preset machining parameter curve, and determining the first machining parameter is abnormal when a difference between the time history curve and machining parameter curve is greater than a preset value;

obtaining real-time image data from a starting point when the first machining parameter is abnormal.

In one possible implementation, the obtaining a keyframe from the real-time image data, and obtaining a second machining parameter from the keyframe, the second machining parameter being processing surface data of the product includes:

calculating energy spectrum data of the first machining parameter when the first machining parameter is abnormal, and obtaining a mutation point by performing singular value analysis on the energy spectrum data;

determining a frame corresponding to the mutation point in the real-time image data as a keyframe; and identifying processing surface coordinates of the product from the keyframe, and determining a curve function which is formed by processing surface coordinates of all keyframes and is distributed along the time history as a second machining parameter.

In one possible implementation, the determining an abnormal cause based on the first machining parameter and the second machining parameter includes:

inputting the first machining parameter to a first processing model to generate a first prediction result, the first prediction result being at least two abnormal causes corresponding to the first machining parameter;

inputting the first machining parameter to a second processing model to generate a second prediction result, the second prediction result being a curve function of the reference coordinates of the processing surface corresponding to the first machining parameter distributed along the time history; and generating a coordinate difference by comparing the difference between the second prediction result and the corresponding second machining parameter, and selecting an abnormal cause corresponding to the first machining parameter and the second machining parameter from the first prediction result according to the coordinate difference.

In one possible implementation, the second processing model corresponds to the deterioration of the knife tool of the lathe or the deterioration of the product to be processed; and the reference coordinates are product processing surface coordinates corresponding to the deterioration of the knife tool of the lathe or the deterioration of the product to be processed under the condition of the first machining parameter.

FIG. 3 is an exemplary flowchart of generating a first prediction result according to some embodiments of the present disclosure. In some embodiments, the process 300 can be executed by the management platform.

Step 310, determining a first feature and a second feature based on the first machining parameter.

In some embodiments, the first feature and the second feature are feature data obtained based on the first machining parameter.

In some embodiments, the first feature includes the time history curve. The time history curve can be used to represent the curve of the first machining parameter changing with time in a preset time period. The first machining parameter may include force data collected on the spindle of the lathe. For example, the first machining parameter may include data such as spindle tangential stress, axial stress, or the like. The abscissa of each point on the time history curve can be a time point, and the ordinate can be the first machining parameter corresponding to each time point.

In some embodiments, the second feature may include at least one of an average value of the first machining parameter, a maximum value of the first machining parameter, a minimum value of the first machining parameter, or an integral under the curve of the time history curve The average value of the first machining parameter can refer to an average value of the force data of the spindle on the production line during a time period. For example, if the spindle tangential force in the first second of the lathe spindle on the production line is 100N, and the spindle tangential force in the second is 200N, the average value of the spindle tangential force in two seconds is 150N.

The maximum value of the first machining parameter may refer to the maximum value of the force data of the lathe spindle on the production line within a period of time. The minimum value of the first machining parameter may refer to the minimum value of the force data of the spindle of the lathe on the production line within a period of time. The integral under the curve of the time history curve can refer to the value of the area under the time history curve over a period of time. For example, the time history curve may include force data of a lathe spindle on a production line produced in one day, and the integral under the time history curve may refer to the corresponding area under the curve between 08:00 and 09:00.

In some embodiments, the obtaining unit of the management platform can obtain the force data of the spindle of the lathe on the production line through the network platform as the first machining parameter, and determine the first feature and second feature based on the first machining parameter.

Step 320, the management platform determines the first prediction result based on the processing of the first feature and the second feature by the first processing model. The first prediction result includes at least two abnormal causes and probabilities corresponding to the abnormal causes.

The first prediction result can refer to a prediction result obtained by predicting the abnormal cause. The abnormal cause may refer to a cause that causes the abnormality of the lathe on the production line or the produced product. Types of abnormal cause may include a part defect and/or a knife tool defect. The knife tool defect may refer to a defect of the tool on the lathe, that is, the deterioration of the knife tool of the lathe. The knife tool defect may include the tool chipping, excessive tool wear, tool breakage, etc. The part defect can refer to a defect of the product to be processed, that is, the product to be processed is deteriorated. The defect of the part can include the material strength of the part product exceeding the standard, the material strength of the part product not meeting the standard, a processing defect of the part product, etc.

In some embodiments, a plurality of abnormal causes may result in abnormal lathe on the production line or the abnormal product produced, and the corresponding first machining parameter at this time may be related to at least one abnormal cause. For example, when tangential stress of the spindle in the first machining parameter is lower than a normal value, it may be co-caused by the tool chipping, the material strength of a part of the product exceeding the standard, and the processing defect of a part of the product. At this time, the first machining parameter may be related to tool chipping, the material strength of the part of the product exceeding the standard, and the processing defect of the part of the product. Further, the management platform may determine the corresponding target second sub-model based on the abnormal cause related to the first machining parameter. For details of the target second sub-model, please refer to the description of other parts of the present disclosure, such as FIG. 5.

In some embodiments, the first processing model can be a machine learning model, for example, a deep neural network model. An input of the first processing model can be the first feature and the second feature, and an output can be at least two abnormal causes and their respective probabilities corresponding to the first feature and the second feature.

In some embodiments, the first processing model can be obtained through training. For example, the management platform inputs the training sample to an initial first processing model, establishes a loss function based on the label and the output results of the initial first processing model, and updates the parameters of the initial first processing model. When the loss function of the initial first processing model satisfies a preset condition, the model training is completed. The preset condition may be that the loss function converges, a count of iterations reaches a threshold, etc.

In some embodiments, the training sample can be a plurality of groups of first features and second features corresponding to one same first machining parameter. The training sample can be obtained based on historical data. The label of the training sample can be abnormal causes corresponding to the first feature and the second feature and a proportion of each abnormal cause. The label corresponding to the first feature and second feature can be manually marked. In some embodiments, the proportion of abnormal cause may be obtained based on statistics, and the proportion of each abnormal cause may be determined based on the types and a count of abnormal causes corresponding to the plurality of first machining parameters, and used as the probability of the abnormal cause.

In some embodiments, the determining, based on the processing of the first feature and the second feature by the first processing model, the first prediction result includes: calculating distances between a sample to be tested and all training samples in a training sample set based on the first processing model, the sample to be tested including the first feature and the second feature; the first processing model obtaining former K training samples with a smallest distance from the sample to be tested as reference samples, K being greater than 0; the first processing model determining a proportion of each abnormal cause to the abnormal causes corresponding to the reference samples based on the abnormal cause corresponding to each sample in the reference samples; the first processing model obtaining the at least N abnormal causes with N largest proportions as candidate abnormalities, and using the proportions corresponding to the candidate abnormalities as the probabilities corresponding to the candidate abnormalities, N being greater than or equal to 2; and the first processing model taking the probabilities of the candidate abnormality and the probabilities corresponding to the candidate abnormalities as the first prediction result. For details of the first processing model, please refer to the description of other parts of the present disclosure, such as FIG. 4.

The at least two abnormal causes and their corresponding probabilities are determined by the first machining parameter, which can cover as many abnormal cause as possible and reduce omissions.

Figure 4:
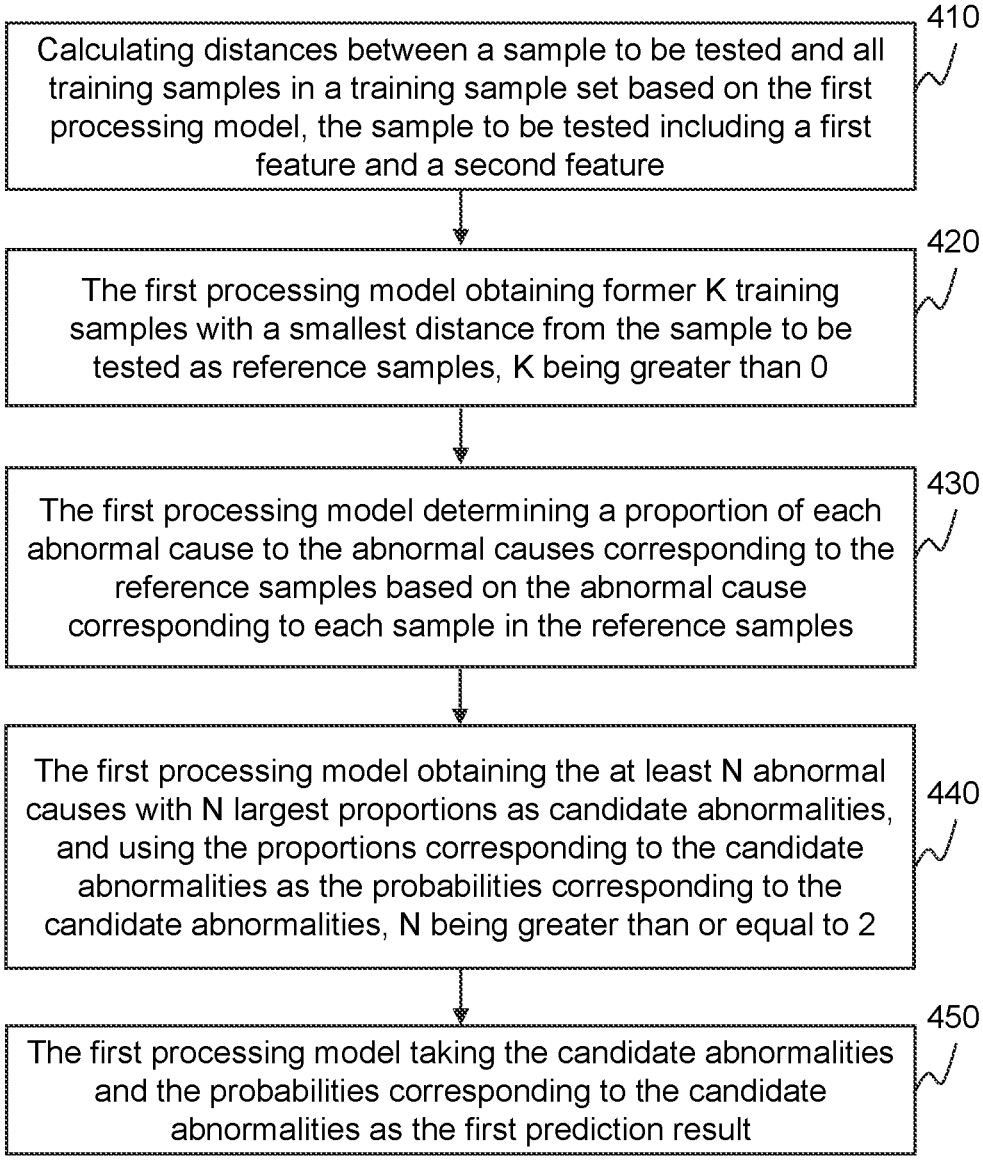
FIG. 4 is an exemplary flowchart of determining a first prediction result based on a first processing model according to some embodiments of the present disclosure.

FIG. 4 is an exemplary flowchart of determining the first prediction result based on the first processing model according to some embodiments of the present disclosure; In some embodiments, the process 400 can be performed by the management platform. As shown in FIG. 4, the process 400 can include the following steps.

Step 410, calculating distances between a sample to be tested and all training samples in a training sample set based on the first processing model. The sample to be tested includes the first feature and the second feature.

The sample to be tested refers to a sample with an unknown production abnormal cause, which can be obtained based on abnormal production data. For example, the sample to be tested can be related production data of a certain production abnormal cause to be determined. In some embodiments, the samples to be tested include the first feature and the second feature. In some embodiments, the first feature is the complex feature data obtained based on the first machining parameter of a certain production abnormal cause to be determined. The second feature is the simple feature obtained based on the first machining parameter of a certain production abnormal cause to be determined. For more content on the first feature and the second feature, see FIG. 3 and its related descriptions.

The training sample refers to a sample with a known production abnormal cause, which can be obtained based on historical production data. In some embodiments, a training sample has a production abnormal cause. For example, a training sample can be caused by the deterioration of a lathe knife. In some embodiments, the training sample also includes the first feature and the second feature. For example, the first feature can be the time history curve of the first machining parameter generated by a certain deterioration of the knife tool of the lathe, and the second feature may be at least one of the average value, the maximum value, the minimum value, and the integral under the curve of the time history curve of the first machining parameter generated by a certain deterioration of the knife tool of the lathe.

The training sample set is a collection of all training samples, which can be obtained based on historical production data. In some embodiments, the training sample set includes a plurality of training samples. Each training sample corresponds to one abnormal cause, and there are a plurality of training samples corresponding to one same abnormal cause.

In some embodiments, the distances between the sample to be tested and all the training samples in the training sample set includes the first distance and the second distance. For example, the distances between the sample to be tested A and the training sample a includes a first distance $s_{Aa1}$ and a second distance $s_{Aa2}$, and the distances between the sample to be tested A to the training sample b includes a first distance $s_{Ab1}$ and a second distance $S_{Ab2}$. In some embodiments, the first distance is a distance determined based on the first feature of the sample to be tested and the first feature of the training sample. The second distance is a distance determined based on the second feature of the sample to be tested and the second feature of the training sample.

In some embodiments, the first distance is an integral value of a curve which formed by absolute values of the difference values between the time history curve of the first machining parameter of the sample to be tested and the time history curve of the first machining parameter of the training sample. In some embodiments, the first distance can be calculated based on obtained samples and training samples. For example, if the time history curve of the first machining parameter of the sample to be tested A is represented by the function $y_A(t)$, the time history curve of the first machining parameter of the training sample a is represented by the function $y_a(t)$, the first distance can be calculated through $\int_{t_1}^{t_2}|y_A(t)-y_a(t)|dt$, wherein the integration interval $[t_1, t_2]$ can be determined based on manual settings In some embodiments, the second distance is a Euclidean distance between the second feature of the sample to be tested and the second feature of the training sample. In some embodiments, the second distance can be calculated based on samples to be tested and training samples. For example, if the second feature of the sample to be tested A includes the average value of the first machining parameter of 23, the maximum value of 45, and the minimum value of 6 and the integral under the curve of a time history curve of 680, the second feature of the sample A to be tested can be expressed as $\vec{x}_A=(23,45,6,680)$; if the second feature of the training sample A includes the average value of the first machining parameter of 15, the maximum value of 30, the minimum value of 4 and the integral under the curve of a time history curve of 420, the second feature of the training sample A can be expressed as $\vec{x}_a=(15,30,4,420)$. The second distance is the Euclidean distance of $\vec{x}_A$ and $\vec{x}_a$, which is calculated as $\sqrt{(23-15)^2+(45-30)^2+(6-4)^2+(680-420)^2}\approx 260.56$.

Based on the first feature and the second feature, the first distance and the second distance of the sample to be tested and the training sample can be obtained. Wherein the first feature is composed of relatively complex feature data, and the second feature is composed of relatively simple feature data. In the next step, reference samples can be selected based on two different distances, and the weights of the two distances can be set separately.

Step 420, the first processing model obtains former K training samples with a smallest distance from the sample to be tested as reference samples, and K>0.

The reference sample is a training sample whose distance from the sample to be tested satisfies a preset condition. In some embodiments, a reference sample has a production abnormal cause. For example, a reference sample can be caused by a certain deterioration of a knife tool.

In some embodiments, the preset conditions can be that the distance between the reference sample and the sample to be tested is the smallest or do not exceed a preset threshold. For example, the reference sample can be the former K training samples with the smallest distance from the sample to be tested. K is a positive integer.

In some embodiments, the distance between the reference sample and the sample to be tested includes the first distance and the second distance. The first distance and the second distance have their own weight values. The weight value is related to the K value.

In some embodiments, the larger the K value, the greater the weight ratio of the first distance to the second distance; the smaller the K value, the greater the weight of the second distance to the weight of the first distance. For example, when K=40, the distance between the reference sample and the sample to be tested=0.85*the first distance+0.15*the second distance; when k=5, the distance between the reference sample and the sample to be tested=0.23*the first distance+0.77*the second distance.

The weight of the first distance and the second distance is adjusted by the K value. When the K value is relatively large, a count of reference samples is relatively large, and the first processing model is relatively simple, i.e., the degree of fitting of the training sample is relatively low. At this time, increasing the weight of the first distance can enable the input features to contain more complex features, thereby improving the predictive ability of the model. When the K value is relatively small, the count of reference samples is relatively small, and the first processing model is relatively complicated, i.e., the degree of fitting of the training sample is relatively high. At this time, increasing the weight of the second distance can enable the input features contain more simple features, thereby reducing the overfitting of the model.

Step 430, the first processing model determines a proportion of each abnormal cause to the abnormal causes corresponding to the reference samples based on the abnormal cause corresponding to each sample in the reference samples.

For example, when K=20, there are 20 reference samples. If the abnormal cause of the 9 reference samples are the tool chipping, the abnormal cause of the 6 reference samples is excessive wear of the tool, the abnormal cause of the 3 reference samples is tool breakage, the abnormal cause of the 2 of the reference samples is that the material strength of the part product does not meet the standard, then it can be determined that the above four abnormal causes account for 45%, 30%, 15% and 10% of the 20 reference samples, respectively.

Step 440, the first processing model obtains the at least N abnormal causes with N largest proportions as candidate abnormalities, and using the proportions corresponding to the candidate abnormalities as the probabilities corresponding to the candidate abnormalities, and N≥2.

Candidate abnormalities refer to at least N abnormal causes selected from abnormal causes of a plurality of reference samples. Wherein, N is a positive integer greater than or equal to 2. For example, in the plurality of reference samples, there are 4 abnormal causes, which are tool chipping, excessive tool wear, knife breakage and the material strength of the parts product not meeting the standard, the proportions of the 4 abnormal causes are 45%, 30%, 15% and 10%, respectively. If N=3, then the 3 abnormal causes with the 3 largest proportions among the 4 abnormal causes are used as candidate abnormalities, and the proportion of each abnormal cause in the candidate abnormalities is used as the probability, that is, the candidate abnormalities are tool chipping, excessive tool wear, knife breakage, the probabilities of the 3 candidate abnormalities are 50%, 33.3% and 16.7%, respectively.

Step 450, the first processing model taking the candidate abnormalities and the probabilities corresponding to the candidate abnormalities as the first prediction result.

In some embodiments, the first prediction result includes at least two candidate abnormalities and its corresponding probabilities. For example, the first prediction result may include (the tool chipping, 50%), (excessive tool wear, 33.3%), and (knife breakage, 16.7%).

Through the first processing model, it is possible to determine at least two candidate abnormal causes and their probabilities based on the samples to be tested and training samples, so as to obtain a preliminary prediction for the production abnormal causes.

Figure 5:
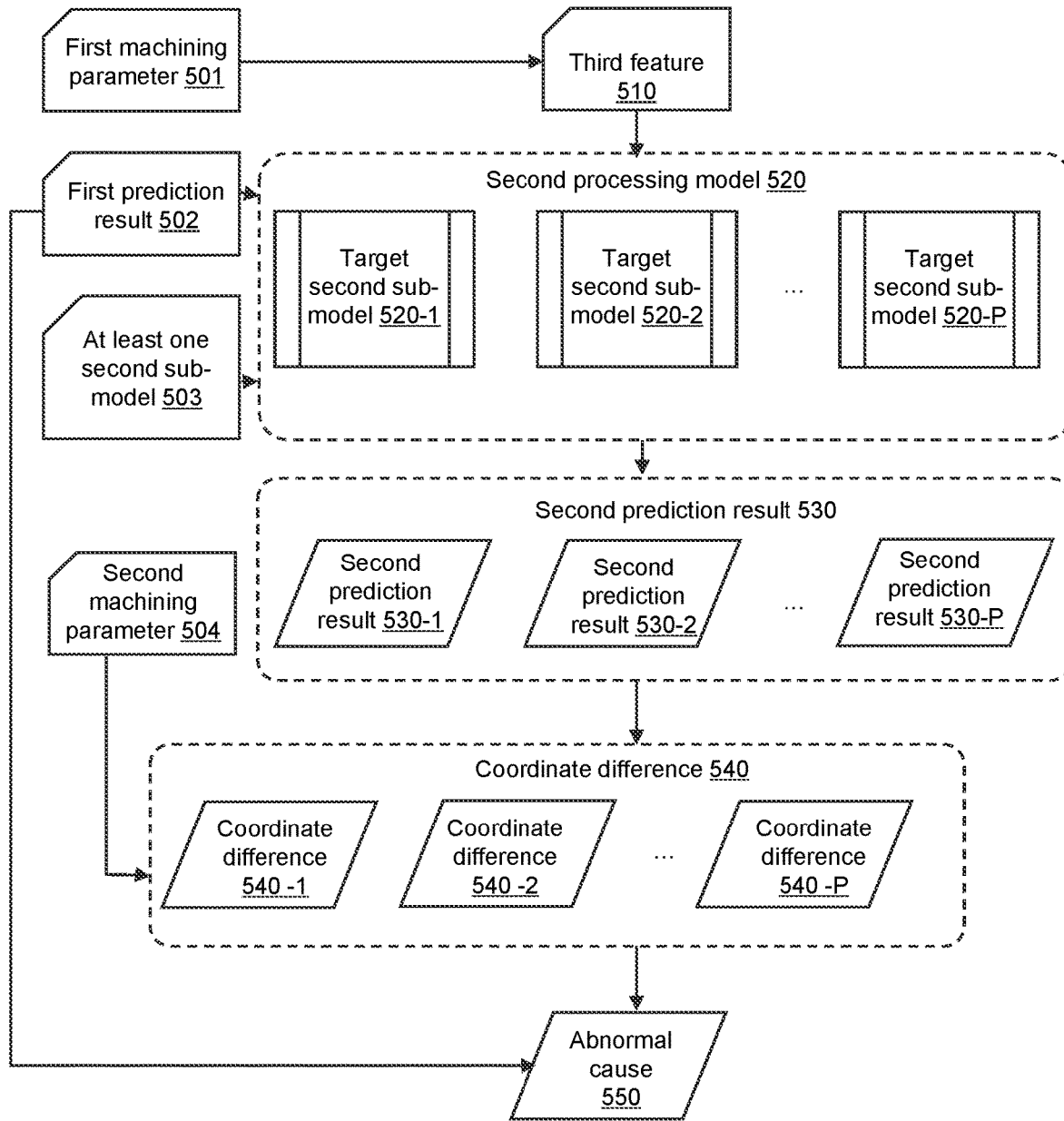
FIG. 5 is a structural diagram of a second processing model according to some embodiments of the present disclosure.

FIG. 5 is a structural diagram of the second processing model according to some embodiments of the present disclosure.

The second processing model includes at least two second sub-models. The second sub-model may include a plurality of types of sub-models, and each type of the second sub-model can process the first machining parameter correspondingly to an abnormal cause accordingly. In some embodiments, each type of second sub-model can correspond to a type of knife defect (that is, deterioration of lathe knife) or parts defects (that is, deterioration of the product to be processed). For example, the second processing model includes the second sub-model A and the second sub-model B. The second sub-model A can be used to process the first machining parameter corresponding to the tool chipping. The second sub-model B can be used to process the first machining parameter corresponding to excessive tool wear.

In some embodiments, the second processing model 520 can generate the second prediction result 530 based on the processing of the first machining parameter 501, which includes: determining the target second sub-model from at least one second sub-model based on the first prediction result 502; determining the third feature 510 based on the first machining parameter 501; determining the second prediction result 530 based on the processing of the third feature 510 by the target second sub-model.

The target second sub-model can refer to the second sub-model corresponding to at least two abnormal causes output by the first processing model. A count of target second sub-models can be the same as a count of abnormal causes output by the first processing model. In some embodiments, the management platform can select the target second sub-model from the second processing model based on the abnormal causes.

The second processing model 520 may include a plurality of second sub-models, and determine at least two target second sub-models from the plurality of second sub-models based on the abnormal causes. For example, as shown in FIG. 5, at least two abnormal causes output by the first processing model can include the knife breakage, the material strength of the part product exceeding the standard, and the material strength of the part product not meeting the standard. Then the target second sub-model may include a second sub-model 520-1 for processing knife breakage, a second sub-model 520-2 for processing the material strength of the part product exceeding the standard, and a second sub-model 520-P for processing the material strength of the part product not meeting the standard.

In some embodiments, the judgment unit can determine the second prediction result 530 through at least two target second sub-models. In some embodiments, the target second sub-model can be a convolutional neural network model. The input of the target second sub-model can include the third feature 510, and the output may include the second prediction result 530.

The third feature includes the time history curve, the parameter of the knife tool of the lathe, the parameter of the product to be processed, or any combination thereof. For details of the time history curve, please refer to the detailed descriptions of other parts of the present disclosure, such as FIG. 2 and FIG. 3.

The parameter of the knife tool of the lathe can include the hardness, shape, current wear condition of the knife tool of the lathe, etc.

The parameter of the product to be processed can include the strength of the material of the product to be processed, whether the strength of the material of the product to be processed meets the standard or exceeds the standard, whether there is a processing defect, etc.

In some embodiments, at least part of the features of the third feature can be obtained through the sensor network platform, such as the parameter of the knife tool of the lathe and the parameter of the product to be processed. In some embodiments, at least part of the features of the third feature can be generated based on the management platform, such as the time history curve.

In some embodiments, the second prediction result 530 may include the simulation result of the time history curve of the reference coordinates. In some embodiments, the reference coordinates are the product processing surface coordinates that correspond to the deterioration of the knife tool or deterioration of the product under the first machining parameter, and the second prediction result 530 can include the timing curve of the product processing surface coordinates predicted based on the first machining parameter caused by the abnormal cause. The predicted product processing surface coordinates change over time. In some embodiments, a count of the second prediction results can be the same as that of the abnormal causes in the first prediction result, which can be at least two.

In some embodiments, the second sub-model can be obtained through training. For example, the management platform inputs the training sample to an initial second sub-model, establishes a loss function based on the label and the output results of the initial second sub-model, and updates the parameters of the initial second sub-model. The model training is completed when the loss function of the initial second sub-model satisfies a preset condition. The preset conditions may be that the loss function converges, a count of iterations reaches a threshold, etc.

In some embodiments, the training sample of the second sub-model of each type may correspond to an abnormal cause. In some embodiments, the training sample of the second sub-model may include the historical time history curve, historical lathe tool parameters, and historical product parameters to be processed corresponding to one same abnormal cause. For example, for the second sub-model corresponding to the material strength of the processed part product exceeding the standard, its training sample may include the historical time history curve, historical lathe tool parameters, and historical product parameters to be processed. Training samples can be obtained based on historical data. A label of a training sample can be the time history curve of the processing face coordinates under the same abnormal cause and the label can be manually marked.

The management platform can determine the corresponding two target second sub-models based on the at least two abnormal causes determined in the first prediction result, and simulate the production situation under different abnormal causes to obtain different second prediction results.

In some embodiments, the management platform compares the second prediction result 530 and the corresponding second machining parameter 504 to generate a coordinate difference 540, and select an abnormal cause 550 corresponding to first machining parameter 501 and the second machining parameter 504 from the first prediction result 502 according to the coordinate difference 540, which includes: based on the second machining parameter 504 and the at least two prediction results 530, determining at least two coordinate differences 540 corresponding to the at least two second prediction results 530; based on at least two coordinate differences 540 and the first prediction result 502, determining a final abnormal cause 550.

The coordinate difference 540 can refer to a difference between the second machining parameter 504 and the second prediction result 530. In some embodiments, a count of coordinate differences 540 can be the same as that of second prediction results 530, which can be at least two. As shown in FIG. 5, the coordinates differences 540 may include a coordinate difference 540-1, a coordinate difference 540-2, a coordinate difference 540-P, etc.

The coordinate difference 540 can reflect the difference between the actual product processing surface coordinates and the predicted product processing surface coordinates. The greater the difference between the actual product processing surface coordinates and the predicted product processing surface coordinates, the larger the difference between the second machining parameter 504 and the second prediction result 530, accordingly, the greater the difference in coordinates. In some embodiments, the coordinate difference 540 can be a real number between 0 and 1. The coordinate difference 540 may be determined by a coordinate residual function based on the second machining parameter 504 and each second prediction result 530, respectively. For example, the coordinate difference between the second machining parameter and the second prediction result A is 0.6, and the coordinate difference between the second machining parameter and the second prediction result B is 0.3, which means that the difference between the second machining parameter and the second prediction result A is greater.

In some embodiments, the judgment unit can determine the final abnormal cause from the at least two abnormal causes in the first prediction result based on the at least two coordinate differences and the first prediction result. In some embodiments, the judgment unit can determine the scores corresponding to the at least two abnormal causes in the first prediction result based on the at least two coordinate differences and the first prediction result. For example, the corresponding scores corresponding to the abnormal cause can be determined by formula (1).

$$S = \alpha \times (1-\beta) \qquad (1)$$

Wherein, S denotes the score corresponding to the abnormal cause, $\alpha$ denotes the probability corresponding to the abnormal cause, and $\beta$ denotes the coordinate difference between the second prediction result corresponding to the abnormal cause and the second machining parameter.

In some embodiments, the higher the score corresponding to the abnormal cause, the greater the possibility of the abnormal cause. This abnormal cause can be used as the final abnormal cause 550. For example, the first prediction result include abnormal causes A and B. The probability of the abnormal cause A is 60%, and the corresponding coordinate difference is 0.5. The probability of the abnormal cause B is 40%, and the corresponding coordinate difference is 0.1. Based on 60%×(1−0.5)<40%×(1−0.1), the abnormal cause B is the final abnormal cause.

Through the difference value of the second machining parameter and the second prediction result, the difference between the predicted product processing surface coordinates and the actual product processing surface coordinates can be determined, and the abnormal cause with small coordinate difference and high probability from the first prediction result may be further determined as the final abnormal cause, which improves the accuracy of the abnormal cause.

It should be noted that the beneficial effects that may be generated in different embodiments may be different in different embodiments, and the beneficial effects that may be generated may be any one or more of the above, or any other beneficial effect may be obtained.

The basic concepts have been described above, apparently, for those skilled in the art, the above-mentioned detailed disclosure is only used as an example, and it does not constitute a limitation of the present disclosure. Although there is no clear explanation here, those skilled in the art may make various modifications, improvements, and corrections for the present disclosure. This type of modification, improvement, and corrections are recommended in the present disclosure , so this class is corrected, improved, and the amendment remains in the spirit and scope of the exemplary embodiment of the present disclosure.

At the same time, the present disclosure uses specific words to describe the embodiments of the present disclosure. For example, "one embodiment," "an embodiment," and/or "some embodiments" mean that a certain feature, structure, or characteristic is connected with at least one embodiment of the present disclosure. Therefore, it should be emphasized and noted that two or more references of "an embodiment" or "one embodiment" or "an alternative embodiment" in various places in the present disclosure do not necessarily refer to the same embodiment. In addition, some features, structures , or characteristics of one or more embodiments in this manual may be properly combined.

Moreover, unless the claims are clearly stated, the sequence of the present disclosure, the use of the digital letters, or the use of other names, is not used to define the order of the present specification processes and methods. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the characteristics required by the object of the present disclosure are more than the characteristics mentioned in the claims. Rather, claimed subject matter may lie in less than all features of a single foregoing disclosed embodiment.

Some embodiments use numbers with description ingredients and attributes. It should be understood that the number described by such examples is used in some examples with the modified words. For example, "about," "approximate" or "substantially" may indicate ±20% variation of the value it describes, unless otherwise stated. Accordingly, in some embodiments, the numerical parameters set forth in the description and attached claims are approximations that may vary depending upon the desired properties sought to be obtained by a particular embodiment. In some embodiments, the numerical parameters should consider the prescribed effective digits and adopt the method of general digit retention. Although the numerical domains and parameters used in this specification are used to confirm its range breadth, in the specific embodiment, the settings of such values are as accurately as possible within the feasible range.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Therefore, merely by way of example and not limitation, alternative configurations of the embodiments of the present disclosure may be considered consistent with the teachings of the present disclosure. Accordingly, embodiments of the present application are not limited to that precisely as shown and described.

What is claimed is:

1. A control system for industrial Internet of Things (IoT) based on abnormal identification, comprising a service platform, a management platform, and a sensor network platform that interact in turn, wherein the system further comprises:
    a non-transitory computer-readable storage medium storing executable instructions; and
    at least one processor in communication with the non-transitory computer-readable storage medium, and when executing the executable instructions, the at least one processor is directed to cause the IoT system to:
    obtain force data of a spindle of a lathe on a production line through the sensor network platform as a first machining parameter;
    detect the first machining parameter, and obtain real-time image data of a product processed by the lathe corresponding to the first machining parameter through the sensor network platform when the first machining parameter is abnormal;
    obtain a keyframe from the real-time image data, and obtain a second machining parameter from the keyframe, the second machining parameter being processing surface data of the product;
    determine an abnormal cause based on the first machining parameter and the second machining parameter; and
    transmit the abnormal cause to a user terminal through the service platform.

2. The control system for the industrial IoT based on abnormal identification of claim 1, wherein the at least one processor is further directed to cause the IoT system to:
    analyze the first machining parameter along a time history to form a time history curve;
    compare the time history curve to a preset machining parameter curve, and determine the first machining parameter is abnormal when a difference between the time history curve and the machining parameter curve is greater than a preset value; and
    obtain the real-time image data from a starting point when the first machining parameter is abnormal.

3. The control system for the industrial IoT based on abnormal identification of claim 1, wherein the at least one processor is further directed to cause the IoT system to:
    calculate energy spectrum data of the first machining parameter when the first machining parameter is abnormal, and obtain a mutation point by performing singular value analysis on the energy spectrum data;
    determine a frame corresponding to the mutation point in the real-time image data as the keyframe; and
    identify processing surface coordinates of the product from the keyframe, and determine a curve function which is formed by processing surface coordinates of all keyframes and is distributed along the time history as the second machining parameter.

4. The control system for the industrial IoT based on abnormal identification of claim 3, wherein the at least one processor is further directed to cause the IoT system to:
    input the first machining parameter to a first processing model to generate a first prediction result, the first prediction result being at least two abnormal causes corresponding to the first machining parameter;
    input the first machining parameter into a second processing model to generate a second prediction result, the second prediction result being a curve function of reference coordinates of the processing surface corresponding to the first machining parameter distributed along the time history; and
    generate a coordinate difference by comparing the second prediction result with the second machining parameter, and select an abnormal cause corresponding to the first machining parameter and the second machining parameter from the first prediction result according to the coordinate difference.

5. The control system for the industrial IoT based on abnormal identification of claim 4, wherein the second processing model corresponds to deterioration of a knife tool of the lathe or deterioration of a product to be processed; and
    the reference coordinates are product processing surface coordinates corresponding to the deterioration of the knife tool of the lathe or the deterioration of the product to be processed under the condition of the first machining parameter.

6. The control system for the industrial IoT based on abnormal identification of claim 4, wherein the inputting the first machining parameter to a first processing model to generate a first prediction result includes: determining a first feature and a second feature based on the first machining parameter, wherein the first feature includes the time history curve and the second feature includes at least one of an average value of the first machining parameter, a maximum value of the first machining parameter, a minimum value of the first machining parameter, or an integral under the curve of the time history curve; and
    determining the first prediction result based on the processing of the first feature and the second feature by the first processing model, the first prediction result including the at least two abnormal causes and probabilities corresponding to the abnormal causes.

7. The control system for the industrial IoT based on abnormal identification of claim 6, wherein the determining the first prediction result based on the processing of the first feature and the second feature by the first processing model includes:

calculating distances between a sample to be tested and all training samples in a training sample set based on the first processing model, the sample to be tested including the first feature and the second feature;

the first processing model obtaining former K training samples with a smallest distance from the sample to be tested as reference samples, K being greater than 0;

the first processing model determining a proportion of each abnormal cause to the abnormal causes corresponding to the reference samples based on the abnormal cause corresponding to each sample in the reference samples;

the first processing model obtaining the at least N abnormal causes with N largest proportions as candidate abnormalities, and using the proportions corresponding to the candidate abnormalities as the probabilities corresponding to the candidate abnormalities, N being greater than or equal to 2; and the first processing model taking the candidate abnormalities and the probabilities corresponding to the candidate abnormalities as the first prediction result.

8. The control system for the industrial IoT based on abnormal identification of claim 7, wherein the distances between the sample to be tested and all training samples in the training sample set includes a first distance and a second distance;

the first distance is an integral value of a curve which formed by absolute values of difference values between the time history curve of the training samples and the first feature; and the second distance is a Euclidean distance between the second feature and each of the training samples.

9. The control system for the industrial IoT based on abnormal identification of claim 6, wherein the second processing model includes at least one second sub-model, and each of the at least one second sub-model corresponds to the first machining parameter corresponding to an abnormal cause; and the inputting first machining parameter into a second processing model to generate a second prediction result includes:

determining a target second sub-model from the at least one second sub-model based on the first prediction result;

determining a third feature based on the first machining parameter, the third feature including at least one of the time history curve, a parameter of the knife tool of the lathe, or a parameter of product to be processed; and determining the second prediction result based on processing of the third feature by the target second sub-model, the second prediction result including a simulation result of the time history curve of the reference coordinate.

10. The control system for the industrial IoT based on abnormal identification of claim 9, wherein the generating a coordinate difference by comparing the second prediction result with the second machining parameter, and selecting an abnormal cause corresponding to the first machining parameter and the second machining parameter from the first prediction result according to the coordinate difference includes:

determining at least two coordinate differences corresponding to the at least two second prediction results based on the second machining parameter and the at least two second prediction results; and determining a final abnormal cause based on the at least two coordinate differences and the first prediction result.

11. The control system for the industrial IoT based on abnormal identification of claim 1, wherein the sensor network platform includes a general sensor network platform and at least two sensor network sub-platforms, different sensor network sub-platforms are used to receive different types of data on the production line, and the general sensor network platform summarizes all data of the sensor network sub-platforms and transmits all the data to the management platform; and the management platform uniformly processes the received data and then uniformly sends the processed data to the service platform; wherein the service platform includes a general service platform and at least two service sub-platforms, and the general service general platform receives the data transmitted by the management platform and transmits different types of data to the user terminal through the different service sub-platforms.

12. A control method of industrial Internet of Things (IoT) based on abnormal identification applied to a service platform, a management platform, and a sensor network platform that interact in turn, wherein the control method performed by the management platform includes:

obtaining force data of a spindle of a lathe on a production line through the sensor network platform as a first machining parameter;

detecting the first machining parameter, and obtaining real-time image data of a product processed by the lathe corresponding to the first machining parameter through the sensor network platform when the first machining parameter is abnormal;

obtaining a keyframe from the real-time image data, and obtaining a second machining parameter from the keyframe, the second machining parameter being processing surface data of the product;

determining an abnormal cause based on the first machining parameter and the second machining parameter; and transmitting the abnormal cause to a user terminal through the service platform.

13. The control method of industrial IoT based on abnormal identification of claim 12, wherein the detecting the first machining parameter, and obtaining real-time image data of a product processed by the lathe corresponding to the first machining parameter through the sensor network platform when the first machining parameter is abnormal includes:

analyzing the first machining parameter along a time history to form a time history curve;

comparing the time history curve to a preset machining parameter curve, and determining the first machining parameter is abnormal when a difference between the time history curve and machining parameter curve is greater than a preset value; and obtaining the real-time image data from a starting point when the first machining parameter is abnormal.

14. The control method of industrial IoT based on abnormal identification of claim 12, wherein the obtaining a keyframe from the real-time image data, and obtaining a second machining parameter from the keyframe, the second machining parameter being processing surface data of the product includes:

calculating energy spectrum data of the first machining parameter when the first machining parameter is abnormal, and obtaining a mutation point by performing singular value analysis on the energy spectrum data;

determining a frame corresponding to the mutation point in the real-time image data as the keyframe; and identifying processing surface coordinates of the product from the keyframe, and determining a curve function which is formed by processing surface coordinates of all keyframes and is distributed along the time history as a second machining parameter.

15. The control method of industrial IoT based on abnormal identification of claim 14, wherein the determining an abnormal cause based on the first machining parameter and the second machining parameter includes:

inputting the first machining parameter into a first processing model to generate a first prediction result, the first prediction result being at least two abnormal causes corresponding to the first machining parameter;

inputting the first machining parameter into a second processing model to generate a second prediction result, the second prediction result being a curve function of the reference coordinates of the processing surface corresponding to the first machining parameter distributed along the time history; and generating a coordinate difference by comparing the second prediction result with the second machining parameter, and selecting an abnormal cause corresponding to the first machining parameter and the second machining parameter from the first prediction result according to the coordinate difference.

16. The control method of industrial IoT based on abnormal identification of claim 15, wherein the inputting the first machining parameter to a first processing model to generate a first prediction result includes: determining a first feature and a second feature based on the first machining parameter, wherein the first feature includes the time history curve and the second feature includes at least one of an average value of the first machining parameter, a maximum value of the first machining parameter, a minimum value of the first machining parameter, or an integral under the curve of the time history curve; and determining the first prediction result based on the processing of the first feature and the second feature by the first processing model, the first prediction result including at least two abnormal causes and the probabilities corresponding to the abnormal causes.

17. The control method of industrial IoT based on abnormal identification of claim 16, wherein the determining the first prediction result based on the processing of the first feature and the second feature by the first processing model includes:

calculating distances between a sample to be tested and all training samples in a training sample set based on the first processing model, the samples to be tested including the first feature and the second feature;

the first processing model obtaining former K training samples with a smallest distance from the sample to be tested as reference samples, K being greater than 0;

the first processing model determining a proportion of each abnormal cause to the abnormal causes corresponding to the reference samples based on the abnormal cause corresponding to each sample in the reference samples;

the first processing model obtaining the at least N abnormal causes with N largest proportions as candidate abnormalities, and using the proportions corresponding to the candidate abnormalities as the probabilities corresponding to the candidate abnormalities, N being greater than or equal to 2; and the first processing model taking the candidate abnormalities and the probabilities corresponding to the candidate abnormalities as the first prediction result.

18. The control method of industrial IoT based on abnormal identification of claim 16, wherein the second processing model includes at least one second sub-model, and each of the at least one second sub-model corresponds to the first machining parameter corresponding to an abnormal cause; and the inputting first machining parameter into a second processing model to generate a second prediction result includes:

determining a target second sub-model from the at least one second sub-model based on the first prediction result;

determining a third feature based on the first machining parameter, the third feature including at least one of the time history curve, a parameter of the knife tool of the lathe, or a parameter of product to be processed; and determining the second prediction result based on processing of the third feature by the target second sub-model, the second prediction result including a simulation result of the time history curve of the reference coordinate.

19. The control method of industrial IoT based on abnormal identification of claim 18, wherein the generating a coordinate difference by comparing the second prediction result with the second machining parameter, and selecting an abnormal cause corresponding to the first machining parameter and the second machining parameter from the first prediction result according to the coordinate difference includes:

determining at least two coordinate differences corresponding to the at least two second prediction results based on the second machining parameter and the at least two second prediction results; and determining a final abnormal cause based on the at least two coordinate differences and the first prediction result.

20. A non-transitory computer-readable medium comprising executable instructions, wherein when executed by at least one processor, the executable instructions cause the at least one processor to perform a method, wherein the method includes:

obtaining force data of a spindle of a lathe on a production line through the sensor network platform as a first machining parameter;

detecting the first machining parameter, and obtaining real-time image data of a product processed by the lathe corresponding to the first machining parameter through the sensor network platform when the first machining parameter is abnormal;

obtaining a keyframe from the real-time image data, and obtaining a second machining parameter from the keyframe, the second machining parameter being processing surface data of the product;

determining an abnormal cause based on the first machining parameter and the second machining parameter; and transmitting the abnormal cause to a user terminal through the service platform.

* * * * *